United States Patent
Omran et al.

(10) Patent No.: US 12,518,773 B2
(45) Date of Patent: Jan. 6, 2026

(54) COMPRESSING AUDIO WAVEFORMS USING A STRUCTURED LATENT SPACE

(71) Applicant: Google LLC, Mountain View, CA (US)

(72) Inventors: Ahmed Omran, Baar (CH); Neil Zeghidour, Paris (FR); Zalán Borsos, Zurich (CH); Félix de Chaumont Quitry, Zürich (CH); Marco Tagliasacchi, Kilchberg (CH)

(73) Assignee: Google LLC, Mountain View, CA (US)

( * ) Notice: Subject to any disclaimer, the term of this patent is extended or adjusted under 35 U.S.C. 154(b) by 200 days.

(21) Appl. No.: 18/278,746

(22) PCT Filed: Mar. 16, 2023

(86) PCT No.: PCT/US2023/015392
§ 371 (c)(1),
(2) Date: Aug. 24, 2023

(87) PCT Pub. No.: WO2023/177803
PCT Pub. Date: Sep. 21, 2023

(65) Prior Publication Data
US 2025/0022477 A1  Jan. 16, 2025

Related U.S. Application Data

(60) Provisional application No. 63/321,407, filed on Mar. 18, 2022.

(51) Int. Cl.
*G10L 21/0208* (2013.01)
*G10L 19/038* (2013.01)

(52) U.S. Cl.
CPC ........ *G10L 21/0208* (2013.01); *G10L 19/038* (2013.01)

(58) Field of Classification Search
None
See application file for complete search history.

(56) References Cited

U.S. PATENT DOCUMENTS 11,257,507 B2 * 2/2022 Garbacea ............... G06N 3/08
11,600,282 B2 * 3/2023 Zeghidour ........... G10L 19/038
(Continued)

OTHER PUBLICATIONS

Trinh, Viet Anh, and Sebastian Braun. "Unsupervised speech enhancement with speech recognition embedding and disentanglement losses." ICASSP 2022-2022 IEEE International Conference on Acoustics, Speech and Signal Processing (ICASSP). IEEE, 2022. (Year: 2022).*

(Continued)

*Primary Examiner* — Douglas Godbold
(74) *Attorney, Agent, or Firm* — Fish & Richardson P.C.

(57) ABSTRACT

Methods, systems, and apparatus, including computer programs encoded on a computer storage medium, for training an encoder neural network and a decoder neural network. In one aspect, a method includes obtaining a first initial audio waveform and a first noisy audio waveform, obtaining a second initial audio waveform and a second noisy audio waveform, processing the first noisy audio waveform and the second noisy audio waveform using an encoder neural network, generating a blended embedding by concatenating: (i) clean feature dimensions from an embedding of the first noisy audio waveform, and (ii) noise feature dimensions from an embedding of the second noisy audio waveform, processing the blended embedding using a decoder neural network to generate a reconstructed audio waveform, determining gradients of an objective function; and updating parameter values of the encoder neural network and the decoder neural network using the gradients.

27 Claims, 8 Drawing Sheets

(56) References Cited

U.S. PATENT DOCUMENTS

| | | | |
|---|---|---|---|
| 2020/0349965 A1* | 11/2020 | Nesta | G06N 3/088 |
| 2021/0166706 A1* | 6/2021 | Lim | G06N 3/08 |
| 2023/0267940 A1* | 8/2023 | Jang | G10L 19/038 |
| | | | 704/500 |
| 2023/0274141 A1* | 8/2023 | Sung | G10L 19/038 |
| 2023/0335109 A1* | 10/2023 | Zhang | G10L 21/003 |
| 2024/0095499 A1* | 3/2024 | Lee | G06N 3/045 |
| 2025/0022477 A1* | 1/2025 | Omran | G10L 25/60 |

OTHER PUBLICATIONS

Bhagat et al., "DisCont: Self-supervised visual attribute disentanglement using context vectors," CoRR, submitted on Jun. 29, 2020, arXiv:2006.05895v2, 11 pages.

Chinen et al., "ViSQOL v3: An open source production ready objective speech and audio metric," Proceedings of International Conference on Quality of Multimedia Experience (QoMEX), May 26, 2020, pp. 1-6.

Chou et al., "Multi-target voice conversion without parallel data by adversarially learning disentangled audio representations," CoRR, submitted on Jun. 24, 2018, arXiv:1804.02812v2, 6 pages.

Engel et al., "DDSP: Differentiable digital signal processing," CoRR, submitted on Jan. 14, 2020, arXiv:2001.04643v1, 19 pages.

Fonseca et al., "Freesound datasets: a platform for the creation of open audio datasets," Proceedings of the 18th International Society for Music Information Retrieval Conference, Oct. 23-27, 2017, pp. 486-493.

Garbacea et al., "Low bit-rate speech coding with VQ-VAE and a WaveNet decoder," Proceedings of IEEE International Conference on Acoustics, Speech and Signal Processing (ICASSP), Apr. 16, 2019, pp. 735-739.

Gfeller et al., "SPICE: Self-supervised pitch estimation," IEEE/ACM Transactions on Audio, Speech, and Language Processing, Mar. 20, 2020, 28:1118-1128.

Gong et al., "Towards learning fine-grained disentangled representations from speech," CoRR, submitted on Aug. 8, 2018, arXiv:1808.02939v1, 3 pages.

Gritsenko et al., "A spectral energy distance for parallel speech synthesis," Proceedings of the 34th International Conference on Neural Information Processing Systems, Dec. 2020, 33:13062-13072.

Hajihassnai et al., "ObscureNet: Learning attribute-invariant latent representation for anonymizing sensor data," Proceedings of International Conference on Internet-of-Things Design and Implementation, May 18, 2021, pp. 40-52.

Higgins et al., "Towards a definition of disentangled representations," CoRR, submitted on Dec. 5, 2018, arXiv:1812.02230v1, 29 pages.

Hines et al., "ViSQOL: An objective speech quality model," EURASIP Journal on Audio, Speech, and Music Processing, Dec. 2015, 18 pages.

Hu et al., "Disentangling factors of variation by mixing them," Proceedings of IEEE Conference on Computer Vision and Pattern Recognition (CVPR), Jun. 18-22, 2018, pp. 3399-3407.

International Search Report and Written Opinion in International Appln. No. PCT/US2023/015392, mailed on Jul. 10, 2023, 17 pages.

Kankanahalli, "End-To-end optimized speech coding with deep neural networks," CoRR, submitted on Dec. 9, 2019, arXiv:1710.09064v2, 5 pages.

Kavalerov et al., "Universal sound separation," Proceedings of IEEE Workshop on Applications of Signal Processing to Audio and Acoustics (WASPAA), Oct. 20-23, 2019, pp. 175-179.

Kulkarni et al., "Deep convolutional inverse graphics network," Proceedings of the 28th International Conference on Neural Information Processing Systems, Dec. 2015, 28:2539-2547.

Lample et al., "Fader networks: Manipulating images by sliding attributes," Proceedings of Advances in Neural Information Processing Systems, Dec. 2017, 30:5969-5978.

Locatello et al., "A sober look at the unsupervised learning of disentangled representations and their evaluation," CoRR, submitted on Oct. 27, 2020, arXiv:2010.14766v1, 62 pages.

Mor et al., "A universal music translation network," CoRR, submitted on May 23, 2018, arXiv:1805.07848v2, 10 pages.

Morishima et al., "Speech coding based on a multi-layer neural network," Proceedings of IEEE International Conference on Communications, vol. 2, Apr. 16, 1990, pp. 429-433.

Nguyen et al., "NVC-Net: End-to-end adversarial voice conversion," CoRR, submitted on Jun. 2, 2021, arXiv:2106.00992v1, 16 pages.

O'Malley et al., "A Conformer-based ASR Frontend for Joint Acoustic Echo Cancellation, Speech Enhancement and Speech Separation," CoRR, submitted on Nov. 18, 2021, arXiv:2111.09935v1, 8 pages.

Park et al., "Swapping autoencoder for deep image manipulation," Proceedings of Advances in Neural Information Processing Systems, Dec. 2020, 33:7198-7211.

Polyak et al., "Speech resynthesis from discrete disentangled self-supervised representations," CoRR, submitted on Jul. 27, 2021, arXiv:2104.00355v3, 5 pages.

Qian et al., "AutoVC: Zero-shot voice style transfer with only autoencoder loss," Proceedings of International Conference on Machine Learning, May 24, 2019, pp. 5210-5219.

Qian et al., "Unsupervised speech decomposition via triple information bottleneck," Proceedings of International Conference on Machine Learning, Nov. 21, 2020, pp. 7836-7846.

Valin et al., "Definition of the Opus audio codec," Internet Engineering Task Force, Request for Comments RFC 6716, Sep. 2012, 326 pages.

Wisdom et al., "Unsupervised sound separation using mixture invariant training," Proceedings of Advances in Neural Information Processing Systems, Dec. 2020, 33:3846-3857.

Xie et al., "Noisy-to-Noisy Voice Conversion Framework with Denoising Model," CoRR, submitted on Sep. 22, 2021, arXiv:2109.10608v1, 7 pages.

Yang et al., "Source-aware neural speech coding for noisy speech compression," Proceedings of 2021 IEEE International Conference on Acoustics, Speech and Signal Processing (ICASSP), May 13, 2021, pp. 706-710.

Zeghidour et al., "SoundStream: An end-to-end neural audio codec," CoRR, submitted on Jul. 7, 2021, arXiv:2107.03312v1, 12 pages.

International Preliminary Report on Patentability in International Appln. No. PCT/US2023/015392, mailed on Oct. 3, 2024, 11 pages.

Office Action in European Appln. No. 23716724.2, mailed on Jun. 17, 2025, 6 pages.

* cited by examiner

DECOMPRESSING AN AUDIO WAVEFORM USING
A TRAINED DECODER NEURAL NETWORK

COMPRESSING AUDIO WAVEFORMS USING A STRUCTURED LATENT SPACE

CROSS-REFERENCE TO RELATED APPLICATIONS

This application is a National Stage Application under 35 U.S.C. § 371 and claims the benefit of International Application No. PCT/US2023/015392, filed Mar. 16, 2023, which claims the benefit of the filing date of U.S. Provisional Patent Application Ser. No. 63/321,407 for "COMPRESSING AUDIO WAVEFORMS USING A STRUCTURED LATENT SPACE," which was filed on Mar. 18, 2022, and which is incorporated here by reference in its entirety.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a training system implemented as computer programs on one or more computers in one or more locations for jointly training an encoder neural network and a decoder neural network.

According to a first aspect there is provided a method performed by one or more computers, the method including: obtaining a first initial audio waveform and a first noisy audio waveform, where the first noisy audio waveform is generated by applying a first set of noise parameters to the first initial audio waveform, obtaining a second initial audio waveform and a second noisy audio waveform, where the second noisy audio waveform is generated by applying a second set of noise parameters to the second initial audio waveform, and processing the first noisy audio waveform and the second noisy audio waveform using an encoder neural network. The encoder neural network is configured to process an input audio waveform to generate embedding of the input audio waveform. The embedding of the input audio waveform includes multiple feature dimensions, where the feature dimensions include: (i) a set of feature dimensions designated as clean feature dimensions, and (ii) a set of feature dimensions designated as noise feature dimensions.

The method further includes generating a blended embedding by concatenating: (i) clean feature dimensions from the embedding of the first noisy audio waveform, and (ii) noise feature dimensions from the embedding of the second noisy audio waveform, processing the blended embedding using a decoder neural network to generate a reconstructed audio waveform, determining gradients of an objective function that measures an error between: (i) the reconstructed audio waveform, and (ii) an audio waveform generated by applying the second set of noise parameters to the first initial audio waveform, and updating parameter values of the encoder neural network and the decoder neural network using the gradients.

In some implementations, the first set of noise parameters includes a first noise waveform.

In some implementations, applying the first set of noise parameters to the first initial audio waveform includes: adding the first noise waveform to the first initial audio waveform.

In some implementations, applying the first set of noise parameters to the first initial audio waveform includes: convolving the first noise waveform with the first initial audio waveform.

In some implementations, the objective function measures the error between: (i) the reconstructed audio waveform, and (ii) the audio waveform generated by applying the second set of noise parameters to the first initial audio waveform, by a multi-scale spectral reconstruction loss.

In some implementations, the set of feature dimensions designated as clean feature dimensions is disjoint from the set of feature dimensions designated as noise feature dimensions.

In some implementations, the embedding of the input audio waveform includes multiple feature vectors representing the input audio waveform, where each feature vector includes: (i) the set of feature dimensions designated as clean feature dimensions, and (ii) the set of feature dimensions designated as noise feature dimensions.

In some implementations, generating the blended embedding includes vector quantizing the blended embedding.

In some implementations, vector quantizing the blended embedding includes: vector quantizing the clean feature dimensions of the blended embedding using a first vector quantizer, and vector quantizing the noise feature dimensions of the blended embedding using a second vector quantizer.

In some implementations, the first initial audio waveform and the second initial audio waveform are speech waveforms or music waveforms.

In some implementations, the encoder neural network and the decoder neural network have respective convolutional neural network architectures.

In some implementations, the method further includes:

In some implementations, processing data derived from the reconstructed audio waveform using a discriminator neural network to generate a set of one or more discriminator scores, where each discriminator score characterizes an estimated likelihood that the reconstructed audio waveform was generated using the encoder neural network and the decoder neural network, where the objective function further incudes an adversarial loss that depends on the discriminator scores generated by the discriminator neural network.

In some implementations, the objective function measures an error between: (i) one or more intermediate outputs generated by the discriminator neural network by processing the reconstructed audio waveform, and (ii) one or more intermediate outputs generated by the discriminator neural network by processing the audio waveform generated by applying the second set of noise parameters to the first initial audio waveform.

In some implementations, the method further includes: obtaining a third initial audio waveform and a third noisy audio waveform, where the third noisy audio waveform is generated by applying a third set of noise parameters to the third initial audio waveform, processing the third noisy audio waveform using the encoder neural network to generate an embedding of the third noisy audio waveform, generating a clean embedding by setting values of the noise feature dimensions of the embedding of the third noisy audio waveform to default values, processing the clean embedding using the decoder neural network to generate a reconstructed audio waveform, determining gradients of an objective function that measures an error between: (i) the reconstructed audio waveform, and (ii) the third initial audio waveform, and updating parameter values of the encoder neural network and the decoder neural network using the gradients.

In some implementations, generating the clean embedding by setting values of the noise feature dimensions of the embedding of the third noisy audio waveform to default values includes: setting values of the noise feature dimensions of the embedding of the third noisy audio waveform to zero.

In some implementations, the method further includes: obtaining a fourth audio waveform, processing the fourth audio waveform using the encoder neural network to generate an embedding of the fourth audio waveform, processing the embedding of the fourth audio waveform to generate a reconstructed audio waveform, determining gradients of an objective function that measures an error between: (i) the reconstructed audio waveform, and (ii) the fourth audio waveform, and updating parameter values of the encoder neural network and the decoder neural network using the gradients.

In some implementations, determining gradients of an objective function that measures an error between: (i) the reconstructed audio waveform, and (ii) an audio waveform generated by applying the second set of noise parameters to the first initial audio waveform, includes: backpropagating gradients of the objective function through the decoder neural network and into the encoder neural network.

In some implementations, updating parameter values of the encoder neural network and the decoder neural network using the gradients includes: updating the parameter values of the encoder neural network and the decoder neural network using the gradients in accordance with a gradient descent optimization technique.

According to a second aspect there is provided a method performed by one or more computers, the method including: obtaining an audio waveform, processing the audio waveform using an encoder neural network that has been trained in accordance with the respective method of any preceding aspect to generate an embedding of the audio waveform, vector quantizing the embedding of the audio waveform, and compressing the quantized embedding of the audio waveform.

In some implementations, the method further includes: before compressing the quantized representation of the audio waveform: removing noise feature dimensions of the embedding of the audio waveform.

In some implementations, the method further includes: before compressing the quantized representation of the audio waveform: scaling noise feature dimensions of the embedding of the audio waveform.

In some implementations, compressing the quantized embedding of the audio waveform includes: compressing clean feature dimensions of the quantized embedding of the audio waveform at a higher bit rate than noise feature dimensions of the quantized embedding of the audio waveform.

In some implementations, compressing the quantized embedding of the audio waveform includes: compressing the quantized embedding of the audio waveform using entropy encoding techniques.

According to a third aspect there is provided a method performed by one or more computers, the method including: receiving a compressed quantized embedding of an audio waveform that is generated by the respective method of any preceding aspect, decompressing the compressed quantized embedding of the audio waveform, and processing the quantized embedding of the audio waveform using a decoder neural network that has been trained in accordance with the respective method of any preceding aspect to generate a reconstruction of the audio waveform.

According to a fourth aspect there is provided a method performed by one or more computers, the method including: obtaining an audio waveform, processing the audio waveform using an encoder neural network to generate an embedding of the audio waveform, where the embedding includes: (i) a set of feature dimensions designated as clean feature dimensions that represent an initial audio signal in the audio waveform, and (ii) a set of feature dimensions designated as noise feature dimensions that represent a noisy audio signal in the audio waveform, modifying the noise feature dimensions of the embedding of the audio waveform, after modifying the noise feature dimensions of the embedding of the audio waveform, vector quantizing the embedding of the audio waveform, and compressing the quantized embedding of the audio waveform.

In some implementations, modifying the noise feature dimensions of the embedding of the audio waveform includes: removing the noise feature dimensions of the embedding of the audio waveform.

In some implementations, modifying the noise feature dimensions of the embedding of the audio waveform includes: scaling the noise feature dimensions of the embedding of the audio waveform.

According to a fifth aspect, there is provided a method performed by one or more computers, the method including: obtaining a compressed quantized embedding of an audio waveform, decompressing the compressed quantized embedding of the audio waveform, where the quantized embedding of the audio waveform includes: (i) a set of vector quantized feature dimensions designated as clean feature dimensions that represent an initial audio signal in the audio waveform, and (ii) a set of vector quantized feature dimensions designated as noise feature dimensions that represent a noisy audio signal in the audio waveform, and processing the quantized embedding of the audio waveform using a decoder neural network to generate a reconstruction of the audio waveform.

According to a sixth aspect, there is provided a system including: one or more computers, and one or more storage devices communicatively coupled to the one or more computers, where the one or more storage devices store instructions that, when executed by the one or more computers, cause the one or more computers to perform the operations of the method of any preceding aspect.

According to a seventh aspect, there are provided one or more non-transitory computer storage media storing instructions that when executed by one or more computers cause the one or more computers to perform the operations of the method of any preceding aspect.

The subject matter described in this specification can be implemented in particular embodiments so as to realize one or more of the following advantages.

The training system described in this specification can train an encoder neural network to generate embeddings of audio waveforms in a structured latent space, i.e., a latent space that includes a set of "clean" feature dimensions and a set of "noise" feature dimensions. The clean feature dimensions of an embedding of an audio waveform can represent a clean audio signal included in the audio waveform, i.e., a part of the audio waveform where noise (e.g., background noise or reverberation effects) have been removed. The noise feature dimensions of an embedding of an audio waveform can represent a noisy audio signal included in the audio waveform, i.e., a part of the audio waveform that represents noise. Thus the feature dimensions of the structured latent space are interpretable, disentangled, and correlated with semantically meaningful attributes of audio waveforms. The training system therefore provides an encoder neural network capable of de-noising a digital audio signal.

The training system can train the encoder neural network along with a decoder neural network using unsupervised learning techniques, i.e., that do not require the input audio signals to be labeled with semantic features, e.g., by manual labeling. Rather, the training system can train the encoder neural network and the decoder neural network on training examples generated in an automated fashion by applying noise parameters to initial audio waveforms. The training system thus enables more efficient use of memory resources, e.g., that would otherwise be required to store manual labels, e.g., if the training system were trained using supervised learning techniques.

Once trained, the encoder neural network can be implemented in a compression system that compresses audio waveforms, and the decoder neural network can be implemented in a decompression system that decompresses audio waveforms. The structured latent space can enable more efficient storage of compressed audio waveforms (e.g., by reducing the amount of memory required to store a compressed audio waveform) and more efficient transmission of compressed audio waveforms (e.g., by reducing the amount of bandwidth required to transmit a compressed audio waveform over a data communications network). For example, the compression system can remove the noise feature dimensions of an audio waveform as part of compressing the audio waveform, or the compression system can compress the noise feature dimensions of the audio waveform at a lower bit rate than the clean feature dimensions of the audio waveform.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
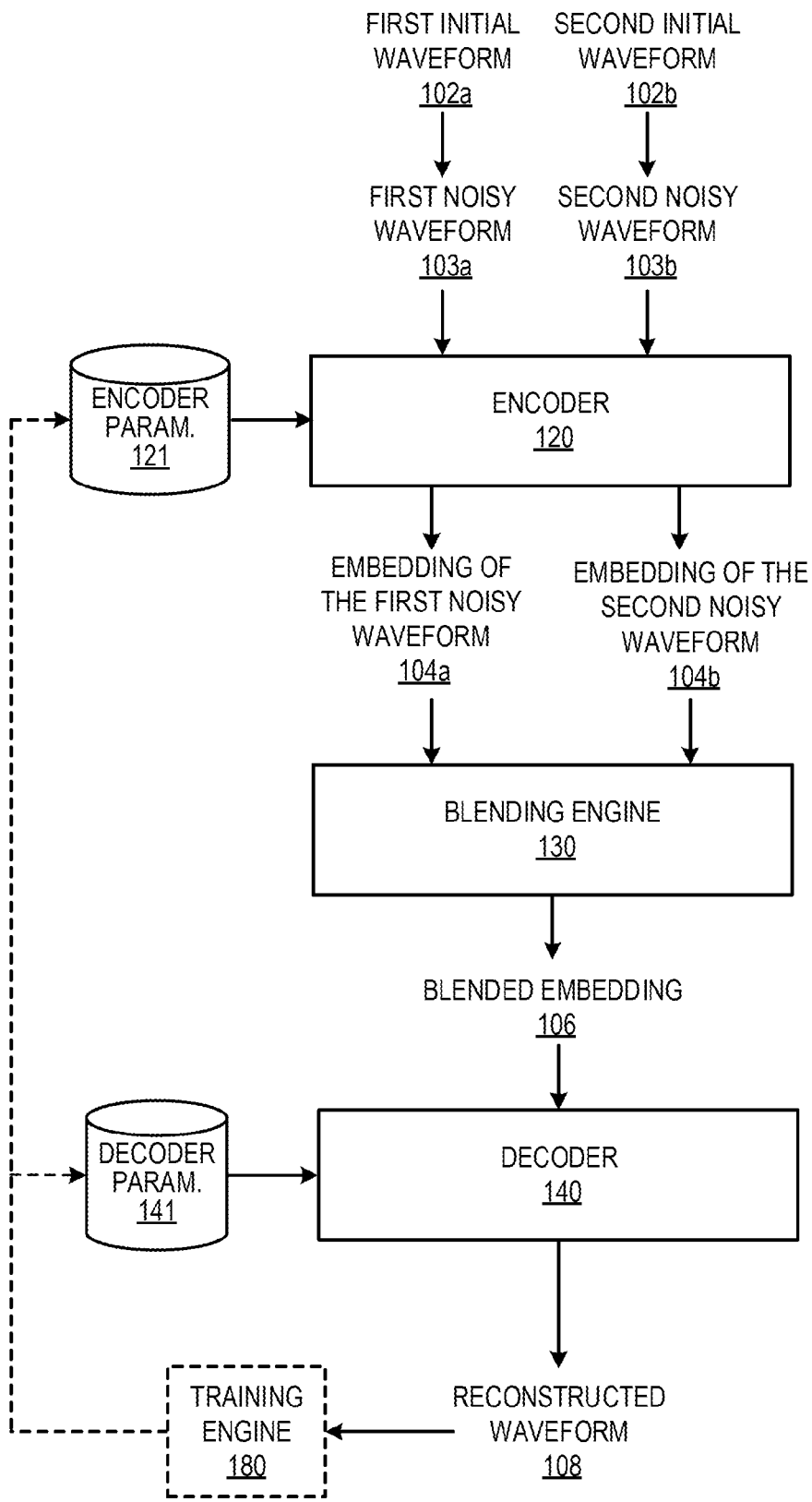
FIG. 1 is a block diagram of an example training system.

FIG. 1 is a block diagram of an example training system 100. The training system 100 is an example of a system implemented as computer programs on one or more computers in one or more locations in which the systems, components, and techniques described below are implemented.

The training system 100 can be configured to process one or more input audio waveforms to jointly train an encoder neural network 120 and a decoder neural network 140. The audio waveforms can capture any appropriate kind of audio data, e.g., the audio waveforms can be speech waveforms (capturing human speech), music waveforms (capturing vocal and/or instrumental sounds), etc. Generally, the one or more input audio waveforms can be understood as including: (i) a clean audio signal, and (ii) one or more noisy audio signals. Throughout this specification, "noise" can generally be interpreted as any distortion of an audio signal, e.g., background noise, reverberation effects, shot noise, transient noise, burst noise, or any other appropriate noise. The clean audio signal can refer to the desired part of the audio signal, e.g., corresponding to speech or music, while each noisy audio signal can represent one or more types of noise in the audio waveform.

After training by the training system 100, the encoder neural network 120 can be implemented in a compression system that compresses audio waveforms, and the decoder neural network 140 can be implemented in a decompression system that decompresses audio waveforms. This is described in more detail below with reference to FIG. 2.

In order to train the encoder neural network 120 and the decoder neural network 140, the training system 100 can process an initial audio waveform 102 and a noisy audio waveform 103, where the noisy audio waveform 103 can include one or more noisy audio signals, e.g., as described above. In some cases, the training system 100 can generate the noisy audio waveform by applying a set of noise parameters to the initial audio waveform. In some cases, the set of noise parameters can include a noise waveform. For example, the training system 100 can generate the noisy audio waveform by adding the noise audio waveform to the initial audio waveform. As a particular example, the training system 100 can generate the noisy audio waveform x by applying the set of noise parameters $\theta$ as follows:

$$x = x^c + \theta \qquad (1)$$

where $x^c$ is the initial (e.g., clean) audio waveform and $\theta$ defines a noise waveform. As another example, the training system 100 can generate the noisy audio waveform by convolving the noise audio waveform with the initial audio waveform. As a particular example, the training system 100 can generate the noisy audio waveform x(t) by applying the set of parameters $\theta(\tau)$ as follows:

$$x(t) = \int \theta(\tau) x^c(t - \tau) d\tau \qquad (2)$$

where $x^c(\cdot)$ is the initial (e.g., clean) audio waveform and $\theta$ defines a noise waveform. Generally, the training system 100 can generate the noisy audio waveform 103 in any appropriate manner.

In order to train the encoder neural network 120 and the decoder neural network 140, the training system 100 can obtain a first audio waveform 102a and a first noisy audio waveform 103a, where the first noisy audio waveform 103a can be generated using the first initial audio waveform 102a and a first set of noise parameters, e.g., as described above. Similarly, the training system 100 can obtain a second audio waveform 102b and a second noisy audio waveform 103b, where the second noisy audio waveform 103b can be generated using the second initial audio waveform 102b and a second set of noise parameters, e.g., as described above. The first set of noise parameters and the second set of noise parameters can be the same, or different, sets of parameters.

After obtaining the audio waveforms 102, 103, the training system 100 can process the audio waveforms 102, 103, using: (i) the encoder neural network 120, (ii) a blending engine 130, and (iii) the decoder neural network 140, each of which is described in more detail next.

The encoder neural network 120 can be configured to process an input audio waveform to generate an embedding of the input audio waveform. Generally, an "embedding" refers to an ordered collection of numerical values such as, e.g., a vector, a matrix, or other tensor, of numerical values. The input audio waveform to the encoder neural network 120 can generally be understood as including: (i) a clean audio signal, and (ii) one or more noisy audio signals. The encoder neural network 120 can be configured through training to generate the embedding of the input audio waveform in a structured latent space, e.g., a latent space that includes a set of "clean" feature dimensions and a set of "noise" feature dimensions. The clean feature dimensions of the embedding of the audio waveform can represent the clean audio signal included in the audio waveform, e.g., a part of the audio waveform where noise (e.g., background noise or reverberation effects) are absent or have been removed. The noise feature dimensions of the embedding of the audio waveform can represent a noisy audio signal included in the audio waveform, i.e., a part of the audio waveform that represents noise.

In other words, the feature dimensions of the embedding of the input audio waveform can include: (i) a set of feature dimensions designated as clean feature dimensions, and (ii) a set of feature dimensions designated as noise feature dimensions. As a particular example, the embedding z of the input audio waveform, generated by the encoder neural network 120, can be represented as follows:

$$z = concat(z^{(1)}, z^{(2)}) \quad (3)$$

where $z^{(1)}$ is the set of clean feature dimensions of the embedding of the input audio waveform, $z^{(2)}$ is the set of noise feature dimensions of the embedding of the input audio waveform, and concat denotes a concatenation operation. In some cases, the set of feature dimensions $z^{(1)}$ designated as clean feature dimensions can be disjoint from the set of feature dimensions $z^{(2)}$ designated as noise feature dimensions. In particular, the set of clean feature dimensions and the set of noise feature dimensions can jointly partition the feature dimensions of an embedding of an audio waveform generated by the encoder neural network 120. The set of clean feature dimensions can constitute any appropriate fraction of the full set of feature dimensions of an embedding of an audio waveform, e.g., 25%, 50%, or 75% of the feature dimensions of an embedding of an audio waveform. For instance, an embedding of an audio waveform can be represented by a sequence of feature vectors, where each feature vector has N entries (where N is a positive integer value). The first $n_1$ entries of each feature vector can be designated as clean feature dimensions, and the final $n_2$ entries of each feature vector can be designated as noise feature dimensions, where $n_1$ and $n_2$ are positive integer values that sum to N.

Specifically, the encoder neural network 120 can process the first noisy audio waveform $x_A = f(x_A^c, \theta_A)$ to generate the embedding $z_A = [z_A^{(1)}, z_A^{(2)}]$ of the first noisy audio waveform 104a, e.g., as described above with reference to equation (3). Similarly, the encoder neural network 120 can process the second noisy audio waveform $x_B = f(x_B^c, \theta_B)$ to generate the embedding $z_B = [z_B^{(1)}, z_B^{(2)}]$ of the second noisy audio waveform 104b, e.g., as described above with reference to equation (3).

The training system 100 can provide the embedding of the first noisy audio waveform 104a and the embedding of the second noisy audio waveform 104b to the blending engine 130. The blending engine 130 can be configured to generate a blended embedding 106. Generally, a "blended embedding" of an embedding of a first noisy audio waveform and an embedding of a second noisy audio waveform can refer to an embedding that includes some feature dimensions from the embedding of the first noisy audio waveform and some feature dimensions from the embedding of the second noisy audio waveform.

For example, the blending engine 130 can generate the blended embedding 106 by concatenating: (i) clean feature dimensions from the embedding of the first noisy audio waveform 104a, and (ii) noise feature dimensions from the embedding of the second noisy audio waveform 104b. As a particular example, the blending engine 130 can be configured to generate the blended embedding $z_{BLENDED}$ as follows: $z_{BLENDED} = [z_A^{(1)}, z_B^{(2)}]$, where $z_A^{(1)}$ represents clean feature dimensions from the embedding $z_A = [z_A^{(1)}, z_A^{(2)}]$ of the first noisy audio waveform 104a, and $z_B^{(2)}$ represents noise feature dimensions from the embedding $z_B = [z_B^{(1)}, z_B^{(2)}]$ of the second noisy audio waveform 104b. An example of generating the blended embedding 106 is described in more detail below with reference to FIG. 3B.

As another example, the blending engine 130 can generate the blended embedding 106 by concatenating: (i) clean feature dimensions from the embedding of the second noisy audio waveform 104b, and (ii) noise feature dimensions from the embedding of the first noisy audio waveform 104a. As a particular example, the blending engine 130 can be configured to generate the blended embedding $z_{BLENDED}$ as follows: $z_{BLENDED} = [z_B^{(1)}, z_A^{(2)}]$, where $z_B^{(1)}$ represents clean feature dimensions from the embedding $z_B = [z_B^{(1)}, z_B^{(2)}]$ of the second noisy audio waveform 104b, and $z_A^{(2)}$ represents noise feature dimensions from the embedding $z_A = [z_A^{(1)}, z_A^{(2)}]$ of the first noisy audio waveform 104a.

In some implementations, as part of generating the blended embedding 106, the blending engine 130 can vector quantize the blended embedding 106. Vector quantizing an embedding can refer to quantizing the embedding using one or more "codebooks" (i.e., sets) of predefined quantization vectors. For example, for the blended embedding $z_{BLENDED} = [z_A^{(1)}, z_B^{(2)}]$, the blending engine 130 can vector quantize the clean feature dimensions $z_A^{(1)}$ of the blended embedding using a first vector quantizer (e.g., having a first set of one or more codebooks), and vector quantize the noise feature dimensions $z_B^{(2)}$ of the blended embedding using a second vector quantizer (e.g., having a second set of one or more codebooks). In other words, the blending engine 130 can be configured to vector quantize each set of feature dimensions of the blended embedding 106 separately. In some cases, the first vector quantizer and the second vector quantizer can be different vector quantizers. In some cases, each vector quantizer can include a stack of vector quantization layers. Each vector quantization layer can be configured to replace its input by one or more vectors, e.g., from a learned discrete codebook (set of vectors), and pass a residual error vector to the subsequent vector quantization layer, i.e., for quantization by the subsequent vector quantization error. (The residual error vector for an input vector to a vector quantization layer can be defined as a difference between: (i) the input vector to the vector quantization layer, and (ii) a replacement vector selected from a codebook at the vector quantization layer to replace the input vector).

The training system 100 can provide the blended embedding 106 to the decoder neural network 140. The decoder neural network 140 can be configured to process the blended embedding 106 to generate a reconstructed audio waveform 108.

The training engine 180 can determine gradients of an objective function that measures an error between: (i) the reconstructed audio waveform 108, and (ii) an audio waveform generated by applying the second set of noise parameters to the first initial audio waveform. Generally, the objective function can take any appropriate form. In some cases, the objective function can measure the error between: (i) the reconstructed audio waveform 108, and (ii) the audio waveform generated by applying the second set of noise parameters to the first initial audio waveform, by a multi-scale spectral reconstruction loss. As a particular example, the multi-scale spectral reconstruction loss $\mathcal{L}_{rec}(x, x')$ can take the following form:

$$\mathcal{L}_{rec}(x, x') = \sum_{log_2 s=6}^{11} \left( \sum_t \|S_t^s(x) - S_t^s(x')\| + \sqrt{\frac{s}{2}} \sum_t \|\log S_t^s(x) - \log S_t^s(x')\| \right) \quad (4)$$

where $S_t^s(\cdot)$ denotes the t-th frame of a 64-bin mel-spectrogram with a window length of s and hop length of s/4. The $L_1$ objective in the first term encourages matching the highest-energy features of the signal, while the $L_2$ logarithmic term provides attention to quieter details. The multi-scale spectral reconstruction loss may be used in conjunction with other objective functions described below that involve measurement of an error with a reconstructed waveform.

The training engine 180 can determine gradients of the objective function, e.g., using backpropagation. In some cases, the training engine 180 can backpropagate gradients of the objective function through the decoder neural network 120 and into the encoder neural network 140. The training engine 180 can update the parameter values 121 of the encoder neural network 120 and the parameter values 141 of the decoder neural network 140 using the gradients, e.g., using any appropriate gradient descent optimization algorithm, e.g., Adam.

Training the encoder neural network and the decoder neural network using the reconstruction loss encourages the reconstructed waveform 108, generated from the blended embedding, to match a "blended" audio waveform generated by applying the second set of noise parameters to the first initial audio waveform. The blended embedding can be generated by blending, e.g., concatenating, the clean feature dimensions of the embedding of the first noisy audio waveform and the noise feature dimensions of the embedding of the second noisy audio waveform. Moreover, the blended audio waveform represents a blending (combination) of the first initial audio waveform and the second set of noise parameters. Thus, training the encoder neural network and the decoder neural network using the reconstruction loss can contribute to causing the noise feature dimensions of the audio waveform embeddings to capture and implicitly represent the noisy audio signal in an audio waveform.

In some implementations, the training system 100 can use a discriminator neural network to generate a set of one or more discriminator scores. Specifically, the training system 100 can process data derived from the reconstructed audio waveform 108 using the discriminator neural network to generate the set of one or more discriminator scores. Each discriminator score can characterize an estimated likelihood that the reconstructed audio waveform 108 was generated using the encoder neural network 120 and the decoder neural network 140, e.g., as opposed to being a "natural" audio waveform, e.g., that was captured by a microphone. Generally, the one or more discriminator scores can include any appropriate numerical values. In some cases, the training system 100 includes multiple discriminator neural networks that are each configured to process an input audio waveform at a respective temporal resolution.

In cases where the training system uses one or more discriminator neural networks, the objective function (e.g., described above) can further include an adversarial loss that depends on the discriminator scores generated by the discriminator neural network. In particular, the adversarial loss can encourage the encoder neural network and the decoder neural network to generate "realistic" reconstructed audio waveforms, e.g., that are not distinguishable from natural audio waveforms. More specifically, the adversarial loss can penalize the encoder and decoder neural networks for generating reconstructed waveforms associated with discriminator scores having values that indicate that the reconstructed waveforms were generated using the encoder and decoder neural networks, as opposed to being natural audio waveforms.

In some implementations, as an alternative to or in combination with the adversarial loss based on the discriminator scores, the objective function can include an additional loss term that measures an error (e.g., an $L_1$ or $L_2$ error) between: (i) one or more intermediate outputs generated by the discriminator neural network by processing the reconstructed audio waveform, and (ii) one or more intermediate outputs generated by the discriminator neural network by processing the audio waveform generated by applying the second set of noise parameters to the first initial audio waveform. (An "intermediate output" of a neural network refers to an output of one or more hidden layers of the neural network).

The encoder neural network 120, the decoder neural network 140, and the discriminator neural network, can have any appropriate neural network architectures that enables them to perform their described functions. For example, they can have any appropriate types of neural network layers (e.g., convolutional layers, fully connected layers, recurrent layers, attention layers, etc.) in any appropriate numbers (e.g., 2 layers, 5 layers, or 10 layers) and connected in any appropriate configuration (e.g., as a linear sequence of layers). In some cases, the encoder neural network 120 and the decoder neural network 140 can have respective convolutional neural network architectures.

In some cases, as part of training the encoder neural network 120 and the decoder neural network 140, the training system can generate a noisy audio waveform from an initial audio waveform, and then process the noisy audio waveform using the encoder neural network to generate an embedding of the noisy audio waveform. The training system can generate a "clean" embedding of the noisy audio waveform, e.g., by setting the noise feature dimensions of the embedding to default values, e.g., zeros. The training system can process the clean embedding using the decoder neural network to generate a reconstructed audio waveform. The training system can train the encoder neural network and the decoder neural network using an objective function that measures an error between the reconstructed audio waveform and the initial audio waveform. Training the encoder and decoder neural networks in this manner encourages the clean feature dimensions of audio waveform embeddings to capture the clean audio signal in an audio waveform and to exclude noisy audio signals in the audio waveform, as will be described in more detail below with reference to FIG. 4.

In some cases, as part of training the encoder neural network 120 and the decoder neural network 140, the training system can obtain an audio waveform (e.g., an initial audio waveform or a noisy audio waveform), generate an embedding of the audio waveform using the encoder neural network, and then generate a reconstruction of the audio waveform using the decoder neural network. The training system can train the encoder neural network using an objective function that measures an error between the audio waveform and the reconstruction of the audio waveform. Training the encoder neural network and the decoder neural network in this manner encourages the embedding of an audio waveform to include rich features that enable accurate reconstruction of the audio waveform (without explicit reference to the distinction between clean and noise feature dimensions in the embedding).

The training system can jointly train the encoder neural network and the decoder neural network, over a sequence of training iterations, on a set of audio waveforms. The audio waveforms can be generated in any appropriate way, e.g., by microphones capturing real-world audio data, or by one or more generative neural networks generating synthetic audio data. At each training iteration, the training system can sample a batch of one or more audio waveforms and train the encoder and decoder neural networks on the audio waveforms to optimize one or more of the objective functions described above.

After training by the training system 100, the encoder neural network 120 can be implemented in a compression system that compresses audio waveforms, and the decoder neural network 140 can be implemented in a decompression system that decompresses audio waveforms. Example implementations of compression and decompression systems are described in more detail below with reference to FIG. 2.

Figure 2:
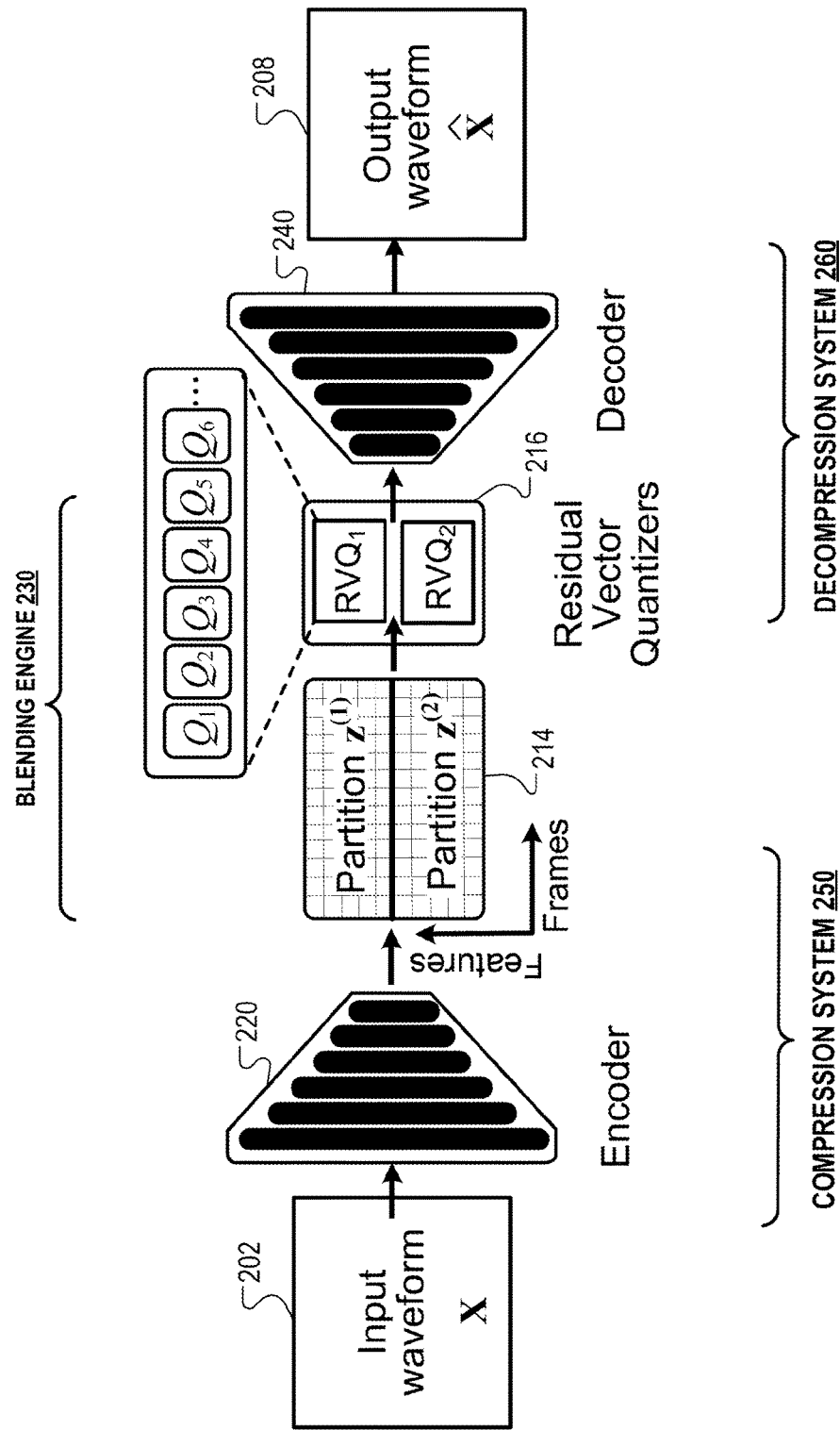
FIG. 2 illustrates example compression and decompression systems.

FIG. 2 illustrates an example compression system 250 and an example decompression system 260. The compression system 250 can include an encoder neural network 220 (e.g., the encoder neural network 120 in FIG. 1) that has been trained by a training system (e.g., the training system 100 in FIG. 1). Similarly, the decompression system 260 can include an decoder neural network 240 (e.g., the decoder neural network 140 in FIG. 1) that has been trained by a training system (e.g., the training system 100 in FIG. 1).

The compression system 250 can be configured to process an input audio waveform 202 using the encoder neural network 120 to generate an embedding 214 of the input audio waveform, e.g., as described above with reference to FIG. 1 and equation (3). The feature dimensions of the embedding 214 of the input audio waveform 202 can include: (i) a set of feature dimensions designated as clean feature dimensions, and (ii) a set of feature dimensions designated as noise feature dimensions.

In some cases, the compression system 250) can be configured to quantize the embedding 214 of the input audio waveform 202 to generate a quantized embedding 216 of the input audio waveform 202, e.g., using vector quantization techniques (as described with reference to FIG. 1). Then, the compression system 250 can compress the quantized embedding 216, e.g., using entropy encoding techniques, e.g., arithmetic coding or Huffman coding.

Optionally, the compression system 250 can compress the clean feature dimensions of an embedding of an audio waveform at a higher bit rate than the noise feature dimensions of the embedding of the audio waveform. For instance, the compression system can compress the clean feature dimensions at a bit rate that is 1.5×, or 2×, or 3×, or 10× the bit rate at which the noise feature dimensions are compressed. (The "bit rate" used to compress data can characterize the number of bits used to represent the compressed data). Thus, given a bit rate budget, the compression system can prioritize the compression and reconstruction of the clean feature dimensions of an audio waveform embedding over the noise feature dimensions of the audio waveform embedding.

The compression system can be implemented in any appropriate location, e.g., on a mobile device (e.g., a smartphone or smartwatch) or in a data center. The compression system can store the compressed representation of the audio waveform, e.g., in a data storage device, or transmit the compressed representation of the audio waveform over a data communications network, e.g., the internet.

The decompression system 260 can be configured to receive the compressed quantized embedding 216 of the input audio waveform 202. The decompression system 260 can decompress the quantized embedding, and process the quantized embedding using the decoder neural network 140 to generate a reconstruction 208 of the input audio waveform 202.

The decompression system can be implemented in any appropriate location, e.g., on a mobile device (e.g., a smartphone or smartwatch) or in a data center. The decompression system can store the reconstructed audio waveforms, e.g., in a data storage device, or provide the reconstructed audio waveform to a speaker to cause the speaker to convert the audio waveform into corresponding sounds.

In some implementations, the compression system 250 can modify the embedding 214 of the input audio waveform 202, e.g., by scaling noise feature dimensions (e.g., by a value in the range (0,1)), or by setting the noise feature dimensions to a default value (e.g., zero). In these instances, the reconstruction 208 generated by the decompression system 260 by processing the modified embedding of the input audio waveform 202 can be an enhanced version of the input audio waveform 202, e.g., where noise or reverberation characteristics are removed from the reconstructed version 208 of the input audio waveform 202.

Generally, as described above, the compression system 250) and the decompression system 260 can be located in any appropriate locations. In particular, the compression system 250) can optionally be located remotely from the decompression system 260. For example, the compression system 250 can be implemented by one or more first computers at a first location, while the decompression system 260 can be implemented by one or more second (different) computers at a second (different) location.

In some implementations, the compression system 250) can generate a compressed representation of the input audio waveform 202 and store the compressed representation in a data store, e.g., a logical data storage area or a physical data storage device. The decompression system 260 can later access the compressed representation from the data store, and process the compressed representation to generate a corresponding output audio waveform 208. The output audio waveform 208 can be, e.g., a reconstruction of the input audio waveform 202 or an enhanced (e.g., de-noised) version of the input audio waveform 202.

In some implementations, the compression system 250) can generate a compressed representation of an input audio waveform 202 and transmit the compressed representation to a destination over a data communication network, e.g., a local area network, a wide area network, or the internet. The decompression system 260) can access the compressed representation at the destination, and process the compressed representation to generate a corresponding output waveform 208. An example process for training the encoder neural network 220 and the decoder neural network 240 by generating a clean embedding is described in more detail next.

Figure 3A:
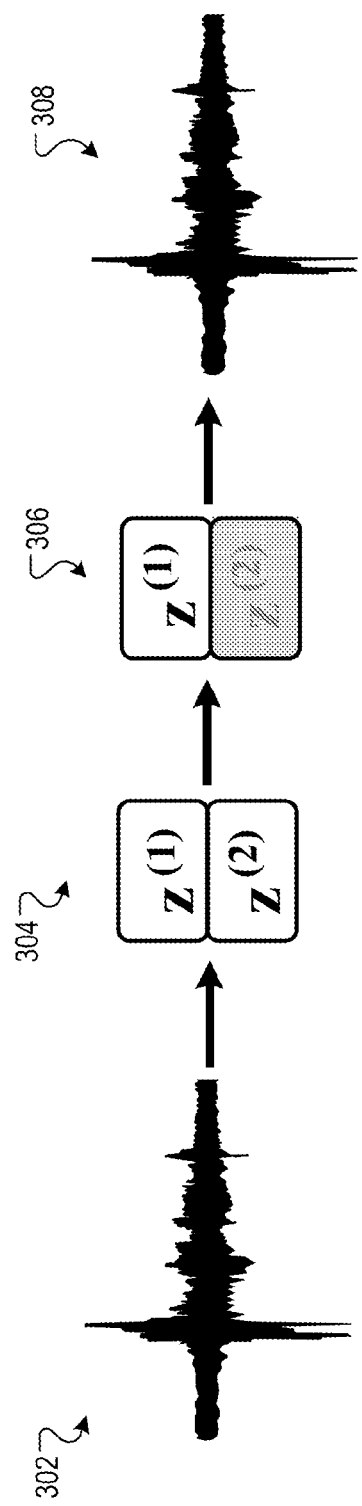
FIG. 3A illustrates an example process for training an encoder neural network and a decoder neural network.

FIG. 3A illustrates an example process for training an encoder neural network and a decoder neural network included in a training system (e.g., the training system 100 in FIG. 1). The training system can obtain a noisy audio waveform, where the noisy audio waveform can be generated by applying a set of noise parameters to an initial audio waveform. The training system can process the noisy audio waveform using the encoder neural network to generate an embedding 304 of the noisy audio waveform, e.g., as described above with reference to equation (3). The feature dimensions of the embedding 304 of the third noisy audio waveform can include: (i) a set of feature dimensions designated as clean feature dimensions, and (ii) a set of feature dimensions designated as noise feature dimensions.

After generating the embedding 304 of the noisy audio waveform, the encoder neural network can generate a clean embedding 306 of the noisy audio waveform by setting values of the noise feature dimensions of the embedding 304 of the noisy audio waveform to default values. For example, the encoder neural network can scale noise feature dimensions (e.g., by a value in the range (0,1)), or set the noise feature dimensions to a default value (e.g., zero).

The training system can provide the clean embedding 306 of the noisy audio waveform to the decoder neural network. The decoder neural network can process the clean embedding 306 to generate a reconstructed audio waveform 308, e.g., as described above with reference to FIG. 1. The training system can use the reconstructed audio waveform 308 to train the encoder neural network and the decoder neural network in a similar way as described above with reference to FIG. 1. Specifically, the training system can determine gradients of an objective function that measures an error between: (i) the reconstructed audio waveform, and (ii) the initial audio waveform. For example, the system can backpropagate gradients of the objective function through the decoder neural network and into the encoder neural network. Then, the training system can update the encoder neural network parameter values of and the decoder neural network parameter values using the gradients, e.g., in accordance with a gradient descent optimization technique.

Figure 3B:
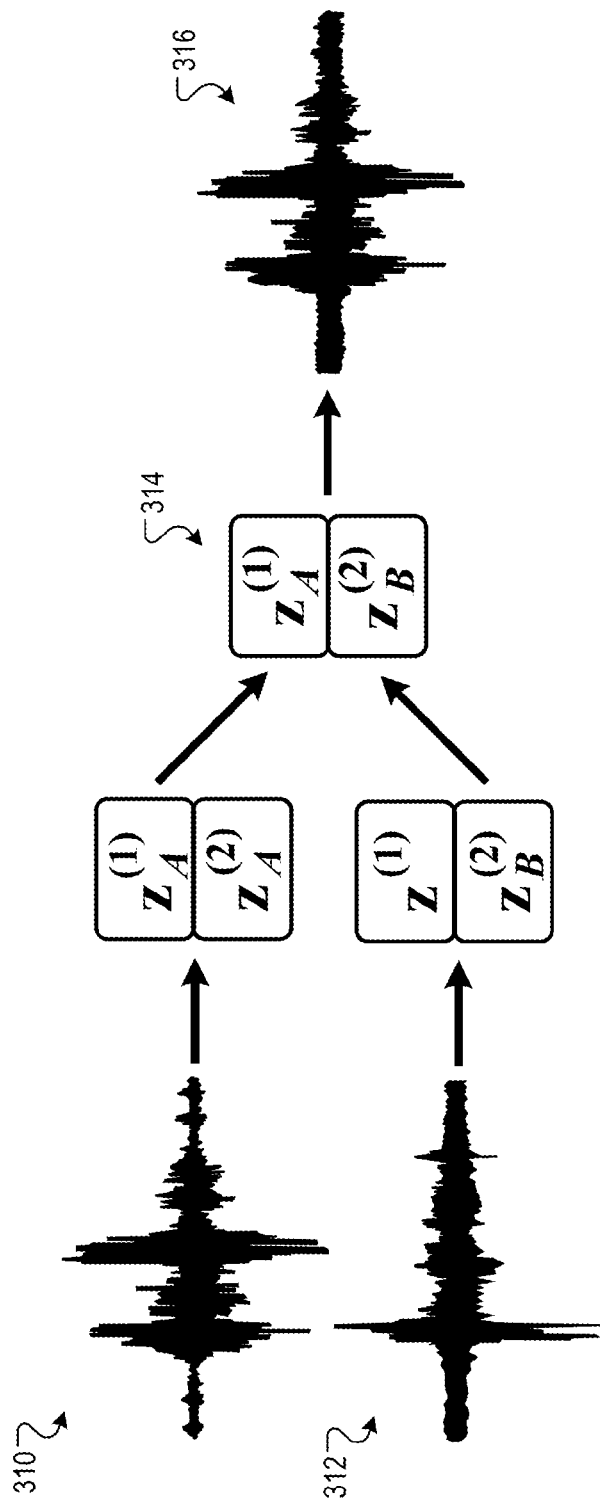
FIG. 3B illustrates an example of generating a blended embedding during training of the encoder neural network and the decoder neural network.

FIG. 3B illustrates an example of generating a blended embedding 314, during training of the encoder neural network and the decoder neural network, by blending (e.g., concatenating): (i) the clean feature dimensions $z_A^{(1)}$ of an embedding of a first noisy audio waveform 310 and the noise feature dimensions $z_B^{(2)}$ of an embedding of a second noisy audio waveform 312. The training system can process the blended embedding 314 using the decoder neural network to generate a blended audio waveform 316. The training system trains the encoder neural network and the decoder neural network to minimize an error between: (i) the blended audio waveform 316, and (ii) a waveform generated by applying the noise parameters of the second audio waveform to the clean version of the first audio waveform, as described with reference to FIG. 1.

An example process for training the encoder neural network and the decoder neural network is described in more detail below with reference to FIG. 4.

Figure 4:
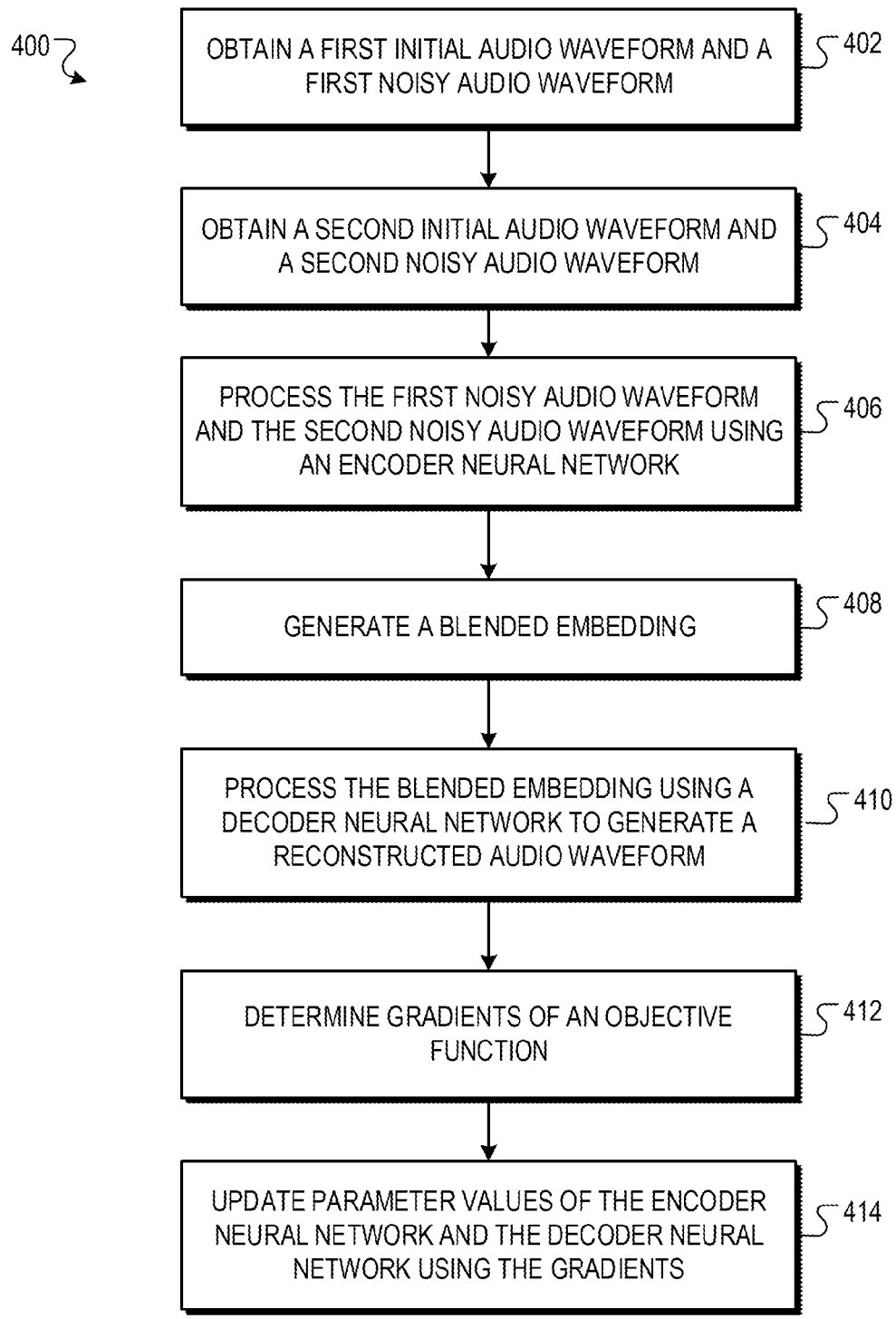
FIG. 4 is a flow diagram of an example process for training an encoder neural network and a decoder neural network.

FIG. 4 is a flow diagram of an example process 400 for training an encoder neural network and a decoder neural network (e.g., the encoder neural network 120 and the decoder neural network 140 in FIG. 1). For convenience, the process 400 is described as being performed by a system of one or more computers located in one or more locations. For example, a training system, e.g., the training system 100 of FIG. 1, appropriately programmed in accordance with this specification, can perform the process 400. The method is for generating a trained encoder neural network and/or decoder neural network for use in audio signal processing tasks including audio compression/decompression and/or audio signal de-noising.

The system obtains a first initial audio waveform and a first noisy audio waveform (402). The first noisy audio waveform can be generated by applying a first set of noise parameters to the first initial audio waveform. In some cases, the first set of noise parameters can include a first noise waveform. In such cases, the system can, e.g., add the first noise waveform to the first initial audio waveform and/or convolve the first noise waveform with the first initial audio waveform.

The system obtains a second initial audio waveform and a second noisy audio waveform (404). The second noisy audio waveform is generated by applying a second set of noise parameters to the second initial audio waveform. In some cases, the first initial audio waveform and the second initial audio waveform can be speech waveforms or music waveforms.

The system processes the first noisy audio waveform and the second noisy audio waveform using an encoder neural network (406). The encoder neural network is configured to process an input audio waveform to generate embedding of the input audio waveform. The embedding of the input audio waveform can include multiple feature dimensions, where the feature dimensions include: (i) a set of feature dimensions designated as clean feature dimensions, and (ii) a set of feature dimensions designated as noise feature dimensions. In some cases, the set of feature dimensions designated as clean feature dimensions can be disjoint from the set of feature dimensions designated as noise feature dimensions.

In some cases, the embedding of the input audio waveform can include multiple feature vectors representing the input audio waveform, where each feature vector includes: (i) the set of feature dimensions designated as clean feature dimensions, and (ii) the set of feature dimensions designated as noise feature dimensions.

The system generates a blended embedding (408). For example, the system can concatenate: (i) clean feature dimensions from the embedding of the first noisy audio waveform, and (ii) noise feature dimensions from the embedding of the second noisy audio waveform. In some cases, generating the blended embedding can include vector quantizing the blended embedding. For example, the system can vector quantize the clean feature dimensions of the blended embedding using a first vector quantizer. The system can further vector quantize the noise feature dimensions of the blended embedding using a second vector quantizer.

The system processes the blended embedding using a decoder neural network to generate a reconstructed audio waveform (410).

The system determines gradients of an objective function (412). The objective function can measure an error between: (i) the reconstructed audio waveform, and (ii) an audio waveform generated by applying the second set of noise parameters to the first initial audio waveform, e.g., by a multi-scale spectral reconstruction loss.

The system updates parameter values of the encoder neural network and the decoder neural network using the gradients (414).

In some cases, the encoder neural network and the decoder neural network can have respective convolutional neural network architectures.

In some implementations, the system can process data derived from the reconstructed audio waveform using a discriminator neural network to generate a set of one or more discriminator scores. Each discriminator score can characterize an estimated likelihood that the reconstructed audio waveform was generated using the encoder neural network and the decoder neural network. In such cases, the objective function can further include an adversarial loss that depends on the discriminator scores generated by the discriminator neural network. For example, the objective function can measure an error between: (i) one or more intermediate outputs generated by the discriminator neural network by processing the reconstructed audio waveform, and (ii) one or more intermediate outputs generated by the discriminator neural network by processing the audio waveform generated by applying the second set of noise parameters to the first initial audio waveform.

In some implementations, the system can obtain a third initial audio waveform and a third noisy audio waveform. The third noisy audio waveform can be generated by applying a third set of noise parameters to the third initial audio waveform. The system can process the third noisy audio waveform using the encoder neural network to generate an embedding of the third noisy audio waveform. The system can generate a clean embedding by setting values of the noise feature dimensions of the embedding of the third noisy audio waveform to default values, e.g., by setting values to zero. The system can process the clean embedding using the decoder neural network to generate a reconstructed audio waveform. The system can determine gradients of an objective function that measures an error between: (i) the reconstructed audio waveform, and (ii) the third initial audio waveform. Then, the system can update parameter values of the encoder neural network and the decoder neural network using the gradients.

In some implementations, the system can obtain a fourth audio waveform. The system can process the fourth audio waveform using the encoder neural network to generate an embedding of the fourth audio waveform. The system can process the embedding of the fourth audio waveform to generate a reconstructed audio waveform. The system can determine gradients of an objective function that measures an error between: (i) the reconstructed audio waveform, and (ii) the fourth audio waveform by, e.g., backpropagating gradients of the objective function through the decoder neural network and into the encoder neural network. Then, the system can update parameter values of the encoder neural network and the decoder neural network using the gradients. For example, the system can update the parameter values of the encoder neural network and the decoder neural network using the gradients in accordance with a gradient descent optimization technique.

Figure 5:
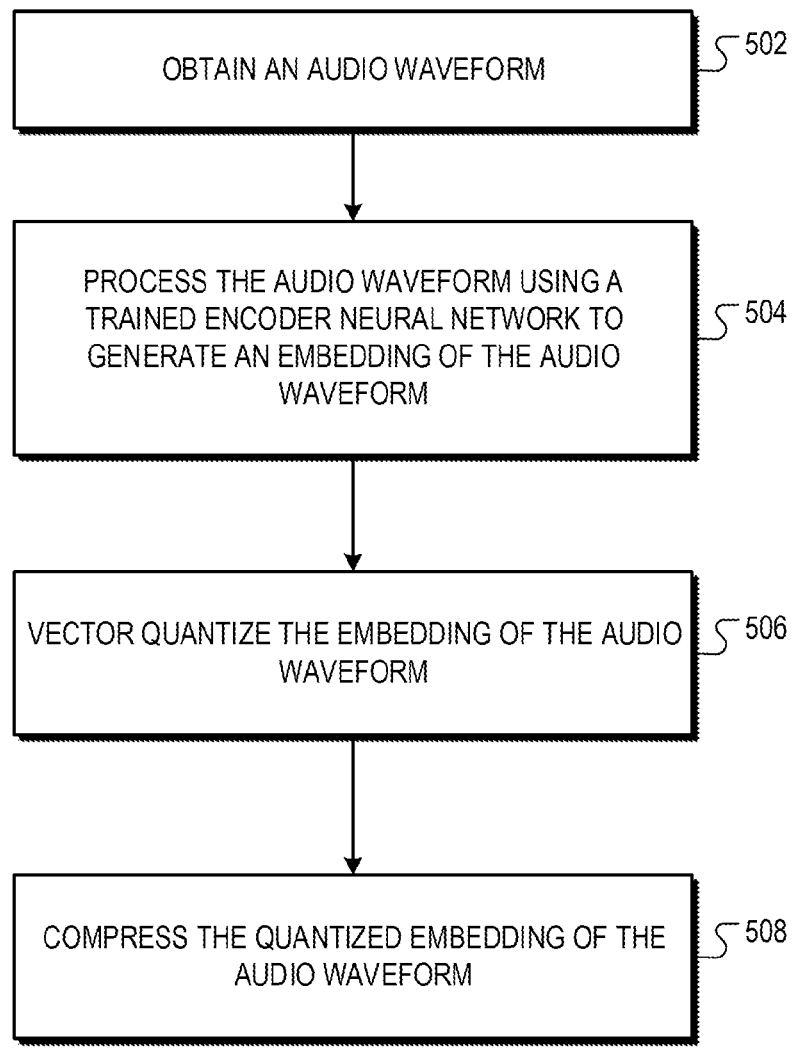
FIG. 5 is a flow diagram of an example process for compressing an audio waveform using a trained encoder neural network.

FIG. 5 is a flow diagram of an example process 500 for compressing an audio waveform using a trained encoder neural network (e.g., the encoder neural network in FIG. 1). For convenience, the process 500 is described as being performed by a system of one or more computers located in one or more locations. For example, a training system, e.g., the training system 100 of FIG. 1, appropriately programmed in accordance with this specification, can perform the process 500. In some cases, the training system can perform the process after training the encoder neural network.

The system obtains an audio waveform (502).

The system processes the audio waveform using a trained encoder neural network (e.g., that has been trained in accordance with the process described above with reference to FIG. 4) to generate an embedding of the audio waveform (504).

The system vector quantizes the embedding of the audio waveform (506), e.g., as described above with reference to FIG. 1.

The system compresses the quantized embedding of the audio waveform (508). For example, the system can compress clean feature dimensions of the quantized embedding of the audio waveform at a higher bit rate than noise feature dimensions of the quantized embedding of the audio waveform. In some cases, the system can compress the quantized embedding of the audio waveform using entropy encoding techniques.

In some cases, before compressing the quantized representation of the audio waveform, the system can remove noise feature dimensions of the embedding of the audio waveform.

In some cases, before compressing the quantized representation of the audio waveform, the system can scale noise feature dimensions of the embedding of the audio waveform.

Figure 6:
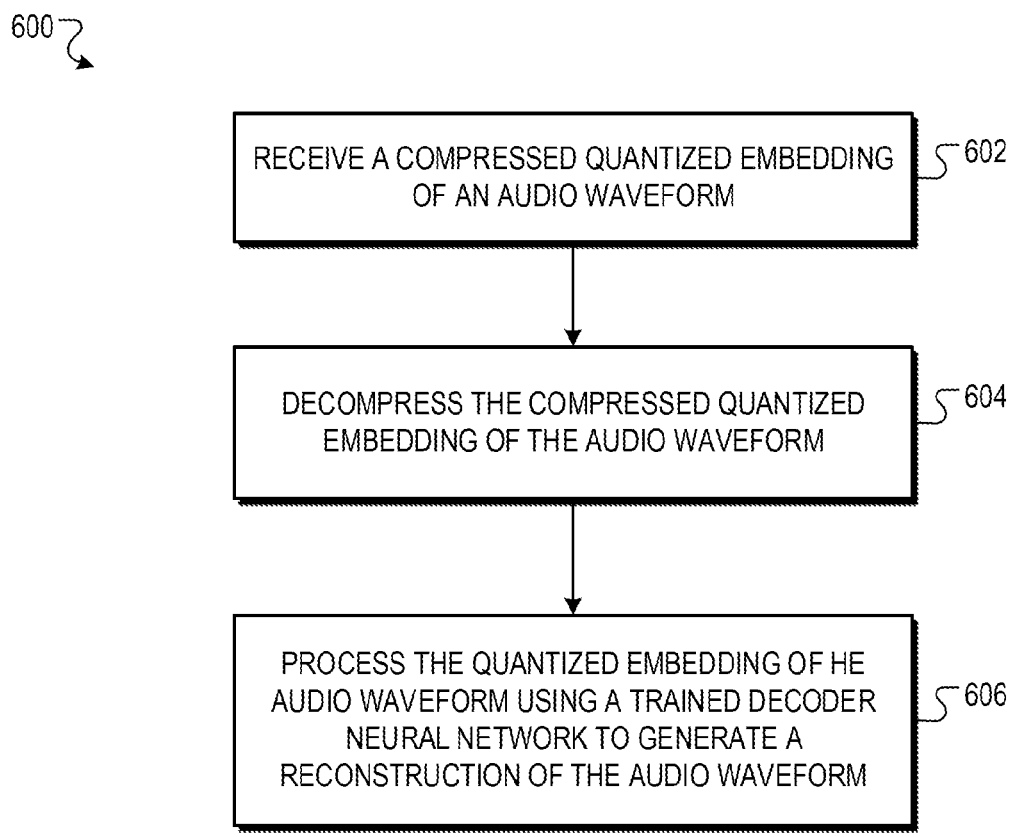
FIG. 6 is a flow diagram of an example process for decompressing an audio waveform using a trained decoder neural network.

FIG. 6 is a flow diagram of an example process 600 for decompressing an audio waveform using a trained decoder neural network. For convenience, the process 600 is described as being performed by a system of one or more computers located in one or more locations. For example, a training system, e.g., the training system 100 of FIG. 1, appropriately programmed in accordance with this specification, can perform the process 600. In some cases, the training system can perform the process after training the decoder neural network.

The system receives a compressed quantized embedding of an audio waveform (602). The compressed quantized embedding of the audio waveform can be generated as described above with reference to FIG. 5.

The system decompresses the compressed quantized embedding of the audio waveform (604).

The system processes the quantized embedding of the audio waveform using a trained decoder neural network, e.g., that has been trained as described above with reference to FIG. 5.

Figure 7:
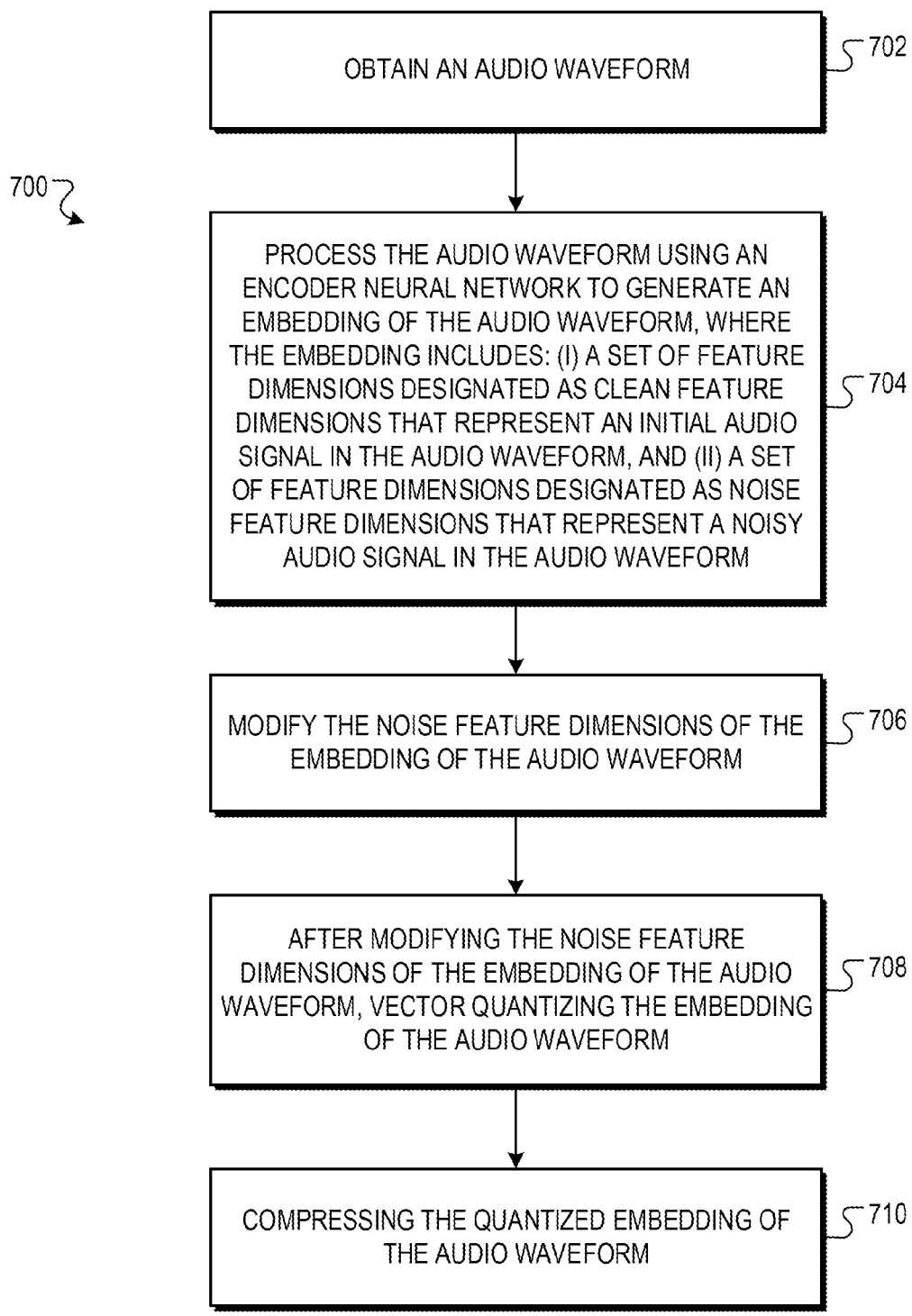
FIG. 7 is a flow diagram of an example process for compressing a modified audio waveform using an encoder neural network.

FIG. 7 is a flow diagram of an example process 700 for compressing a modified audio waveform using an encoder neural network. For convenience, the process 700 is described as being performed by a system of one or more computers located in one or more locations. For example, a training system, e.g., the training system 100 of FIG. 1, appropriately programmed in accordance with this specification, can perform the process 700. In some cases, the training system can perform the process after training the encoder neural network and the decoder neural network.

The system obtains an audio waveform (702).

The system processes the audio waveform using an encoder neural network to generate an embedding of the audio waveform (704). The embedding can include: (i) a set of feature dimensions designated as clean feature dimensions that represent an initial audio signal in the audio waveform, and (ii) a set of feature dimensions designated as noise feature dimensions that represent a noisy audio signal in the audio waveform.

The system modifies the noise feature dimensions of the embedding of the audio waveform (706). For example, the system can remove the noise feature dimensions of the embedding of the audio waveform. In some cases, the system can scale the noise feature dimensions of the embedding of the audio waveform.

After modifying the noise feature dimensions of the embedding of the audio waveform, the system vector quantizes the embedding of the audio waveform (708).

The system compresses the quantized embedding of the audio waveform (710).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages: and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine: in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks: magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   obtaining a first initial audio waveform and a first noisy audio waveform, wherein the first noisy audio waveform is generated by applying a first set of noise parameters to the first initial audio waveform;
   obtaining a second initial audio waveform and a second noisy audio waveform, wherein the second noisy audio waveform is generated by applying a second set of noise parameters to the second initial audio waveform;
   processing the first noisy audio waveform and the second noisy audio waveform using an encoder neural network, wherein:
      the encoder neural network is configured to process an input audio waveform to generate embedding of the input audio waveform; and
      the embedding of the input audio waveform comprises a plurality of feature dimensions, wherein the plurality of feature dimensions comprises: (i) a set of feature dimensions designated as clean feature dimensions, and (ii) a set of feature dimensions designated as noise feature dimensions;
   generating a blended embedding by concatenating: (i) clean feature dimensions from the embedding of the first noisy audio waveform, and (ii) noise feature dimensions from the embedding of the second noisy audio waveform;
   processing the blended embedding using a decoder neural network to generate a reconstructed audio waveform;

determining gradients of an objective function that measures an error between: (i) the reconstructed audio waveform, and (ii) an audio waveform generated by applying the second set of noise parameters to the first initial audio waveform; and updating parameter values of the encoder neural network and the decoder neural network using the gradients.

2. The method of claim 1, wherein the first set of noise parameters comprises a first noise waveform.

3. The method of claim 2, wherein applying the first set of noise parameters to the first initial audio waveform comprises:

adding the first noise waveform to the first initial audio waveform.

4. The method of claim 2, wherein applying the first set of noise parameters to the first initial audio waveform comprises:

convolving the first noise waveform with the first initial audio waveform.

5. The method of claim 1, wherein the objective function measures the error between: (i) the reconstructed audio waveform, and (ii) the audio waveform generated by applying the second set of noise parameters to the first initial audio waveform, by a multi-scale spectral reconstruction loss.

6. The method of claim 1, wherein the set of feature dimensions designated as clean feature dimensions is disjoint from the set of feature dimensions designated as noise feature dimensions.

7. The method of claim 1, wherein the embedding of the input audio waveform comprises a plurality of feature vectors representing the input audio waveform, wherein each feature vector comprises: (i) the set of feature dimensions designated as clean feature dimensions, and (ii) the set of feature dimensions designated as noise feature dimensions.

8. The method of claim 1, wherein generating the blended embedding comprises vector quantizing the blended embedding.

9. The method of claim 8, wherein vector quantizing the blended embedding comprises:

vector quantizing the clean feature dimensions of the blended embedding using a first vector quantizer; and
vector quantizing the noise feature dimensions of the blended embedding using a second vector quantizer.

10. The method of claim 1, wherein the first initial audio waveform and the second initial audio waveform are speech waveforms or music waveforms.

11. The method of claim 1, wherein the encoder neural network and the decoder neural network have respective convolutional neural network architectures.

12. The method of claim 1, further comprising:

processing data derived from the reconstructed audio waveform using a discriminator neural network to generate a set of one or more discriminator scores, wherein each discriminator score characterizes an estimated likelihood that the reconstructed audio waveform was generated using the encoder neural network and the decoder neural network;

wherein the objective function further comprises an adversarial loss that depends on the discriminator scores generated by the discriminator neural network.

13. The method of claim 12, wherein the objective function measures an error between: (i) one or more intermediate outputs generated by the discriminator neural network by processing the reconstructed audio waveform, and (ii) one or more intermediate outputs generated by the discriminator neural network by processing the audio waveform generated by applying the second set of noise parameters to the first initial audio waveform.

14. The method of claim 1, further comprising:

obtaining a third initial audio waveform and a third noisy audio waveform, wherein the third noisy audio waveform is generated by applying a third set of noise parameters to the third initial audio waveform;

processing the third noisy audio waveform using the encoder neural network to generate an embedding of the third noisy audio waveform;

generating a clean embedding by setting values of the noise feature dimensions of the embedding of the third noisy audio waveform to default values;

processing the clean embedding using the decoder neural network to generate a reconstructed audio waveform;

determining gradients of an objective function that measures an error between: (i) the reconstructed audio waveform, and (ii) the third initial audio waveform; and updating parameter values of the encoder neural network and the decoder neural network using the gradients.

15. The method of claim 14, wherein generating the clean embedding by setting values of the noise feature dimensions of the embedding of the third noisy audio waveform to default values comprises:

setting values of the noise feature dimensions of the embedding of the third noisy audio waveform to zero.

16. The method of claim 1, further comprising:

obtaining a fourth audio waveform;

processing the fourth audio waveform using the encoder neural network to generate an embedding of the fourth audio waveform;

processing the embedding of the fourth audio waveform to generate a reconstructed audio waveform;

determining gradients of an objective function that measures an error between: (i) the reconstructed audio waveform, and (ii) the fourth audio waveform; and updating parameter values of the encoder neural network and the decoder neural network using the gradients.

17. The method of claim 1, wherein determining gradients of an objective function that measures an error between: (i) the reconstructed audio waveform, and (ii) an audio waveform generated by applying the second set of noise parameters to the first initial audio waveform, comprises:

backpropagating gradients of the objective function through the decoder neural network and into the encoder neural network.

18. The method of claim 1, wherein updating parameter values of the encoder neural network and the decoder neural network using the gradients comprises:

updating the parameter values of the encoder neural network and the decoder neural network using the gradients in accordance with a gradient descent optimization technique.

19. A method performed by one or more computers, the method comprising:

obtaining an audio waveform;

processing the audio waveform using an encoder neural network to generate an embedding of the audio waveform;

wherein the encoder neural network has been trained by performing operations comprising:

obtaining a first initial audio waveform and a first noisy audio waveform, wherein the first noisy audio waveform is generated by applying a first set of noise parameters to the first initial audio waveform;

obtaining a second initial audio waveform and a second noisy audio waveform, wherein the second noisy audio waveform is generated by applying a second set of noise parameters to the second initial audio waveform;

processing the first noisy audio waveform and the second noisy audio waveform using the encoder neural network, wherein:

the encoder neural network is configured to process an input audio waveform to generate embedding of the input audio waveform; and the embedding of the input audio waveform comprises a plurality of feature dimensions, wherein the plurality of feature dimensions comprises: (i) a set of feature dimensions designated as clean feature dimensions, and (ii) a set of feature dimensions designated as noise feature dimensions;

generating a blended embedding by concatenating: (i) clean feature dimensions from the embedding of the first noisy audio waveform, and (ii) noise feature dimensions from the embedding of the second noisy audio waveform;

processing the blended embedding using a decoder neural network to generate a reconstructed audio waveform;

determining gradients of an objective function that measures an error between: (i) the reconstructed audio waveform, and (ii) an audio waveform generated by applying the second set of noise parameters to the first initial audio waveform; and updating parameter values of the encoder neural network and the decoder neural network using the gradients;

vector quantizing the embedding of the audio waveform; and compressing the quantized embedding of the audio waveform.

20. The method of claim 19, further comprising, before compressing the quantized representation of the audio waveform:

removing noise feature dimensions of the embedding of the audio waveform.

21. The method of claim 19, further comprising, before compressing the quantized representation of the audio waveform:

scaling noise feature dimensions of the embedding of the audio waveform.

22. The method of claim 19, wherein compressing the quantized embedding of the audio waveform comprises:

compressing clean feature dimensions of the quantized embedding of the audio waveform at a higher bit rate than noise feature dimensions of the quantized embedding of the audio waveform.

23. The method of claim 19, wherein compressing the quantized embedding of the audio waveform comprises:

compressing the quantized embedding of the audio waveform using entropy encoding techniques.

24. A method performed by one or more computers, the method comprising:

receiving a compressed quantized embedding of an audio waveform that is generated by the performing operations comprising:

processing the audio waveform using an encoder neural network to generate an embedding of the audio waveform;

wherein the encoder neural network has been trained by performing operations comprising:

obtaining a first initial audio waveform and a first noisy audio waveform, wherein the first noisy audio waveform is generated by applying a first set of noise parameters to the first initial audio waveform;

obtaining a second initial audio waveform and a second noisy audio waveform, wherein the second noisy audio waveform is generated by applying a second set of noise parameters to the second initial audio waveform;

processing the first noisy audio waveform and the second noisy audio waveform using the encoder neural network, wherein:

the encoder neural network is configured to process an input audio waveform to generate embedding of the input audio waveform; and the embedding of the input audio waveform comprises a plurality of feature dimensions, wherein the plurality of feature dimensions comprises: (i) a set of feature dimensions designated as clean feature dimensions, and (ii) a set of feature dimensions designated as noise feature dimensions;

generating a blended embedding by concatenating: (i) clean feature dimensions from the embedding of the first noisy audio waveform, and (ii) noise feature dimensions from the embedding of the second noisy audio waveform;

processing the blended embedding using a decoder neural network to generate a reconstructed audio waveform;

determining gradients of an objective function that measures an error between: (i) the reconstructed audio waveform, and (ii) an audio waveform generated by applying the second set of noise parameters to the first initial audio waveform; and updating parameter values of the encoder neural network and the decoder neural network using the gradients;

vector quantizing the embedding of the audio waveform; and compressing the quantized embedding of the audio waveform; and decompressing the compressed quantized embedding of the audio waveform.

25. A method performed by one or more computers, the method comprising:

obtaining a compressed quantized embedding of an audio waveform;

decompressing the compressed quantized embedding of the audio waveform, wherein the quantized embedding of the audio waveform comprises: (i) a set of vector quantized feature dimensions designated as clean feature dimensions that represent an initial audio signal in the audio waveform, and (ii) a set of vector quantized feature dimensions designated as noise feature dimensions that represent a noisy audio signal in the audio waveform; and processing the quantized embedding of the audio waveform using a decoder neural network to generate a reconstruction of the audio waveform.

26. A system comprising:

one or more computers; and one or more storage devices communicatively coupled to the one or more computers, wherein the one or more storage devices store instructions that, when executed by the one or more computers, cause the one or more computers to perform operations comprising:

obtaining a first initial audio waveform and a first noisy audio waveform, wherein the first noisy audio waveform is generated by applying a first set of noise parameters to the first initial audio waveform;

obtaining a second initial audio waveform and a second noisy audio waveform, wherein the second noisy audio waveform is generated by applying a second set of noise parameters to the second initial audio waveform;

processing the first noisy audio waveform and the second noisy audio waveform using an encoder neural network, wherein:
- the encoder neural network is configured to process an input audio waveform to generate embedding of the input audio waveform; and
- the embedding of the input audio waveform comprises a plurality of feature dimensions, wherein the plurality of feature dimensions comprises: (i) a set of feature dimensions designated as clean feature dimensions, and (ii) a set of feature dimensions designated as noise feature dimensions;

generating a blended embedding by concatenating: (i) clean feature dimensions from the embedding of the first noisy audio waveform, and (ii) noise feature dimensions from the embedding of the second noisy audio waveform;

processing the blended embedding using a decoder neural network to generate a reconstructed audio waveform;

determining gradients of an objective function that measures an error between: (i) the reconstructed audio waveform, and (ii) an audio waveform generated by applying the second set of noise parameters to the first initial audio waveform; and updating parameter values of the encoder neural network and the decoder neural network using the gradients.

27. One or more non-transitory computer storage media storing instructions that when executed by one or more computers cause the one or more computers to perform operations comprising:

obtaining a first initial audio waveform and a first noisy audio waveform, wherein the first noisy audio waveform is generated by applying a first set of noise parameters to the first initial audio waveform;

obtaining a second initial audio waveform and a second noisy audio waveform, wherein the second noisy audio waveform is generated by applying a second set of noise parameters to the second initial audio waveform;

processing the first noisy audio waveform and the second noisy audio waveform using an encoder neural network, wherein:
- the encoder neural network is configured to process an input audio waveform to generate embedding of the input audio waveform; and
- the embedding of the input audio waveform comprises a plurality of feature dimensions, wherein the plurality of feature dimensions comprises: (i) a set of feature dimensions designated as clean feature dimensions, and (ii) a set of feature dimensions designated as noise feature dimensions;

generating a blended embedding by concatenating: (i) clean feature dimensions from the embedding of the first noisy audio waveform, and (ii) noise feature dimensions from the embedding of the second noisy audio waveform;

processing the blended embedding using a decoder neural network to generate a reconstructed audio waveform;

determining gradients of an objective function that measures an error between: (i) the reconstructed audio waveform, and (ii) an audio waveform generated by applying the second set of noise parameters to the first initial audio waveform; and updating parameter values of the encoder neural network and the decoder neural network using the gradients.

* * * * *